United States Patent Office 3,698,977
Patented Oct. 17, 1972

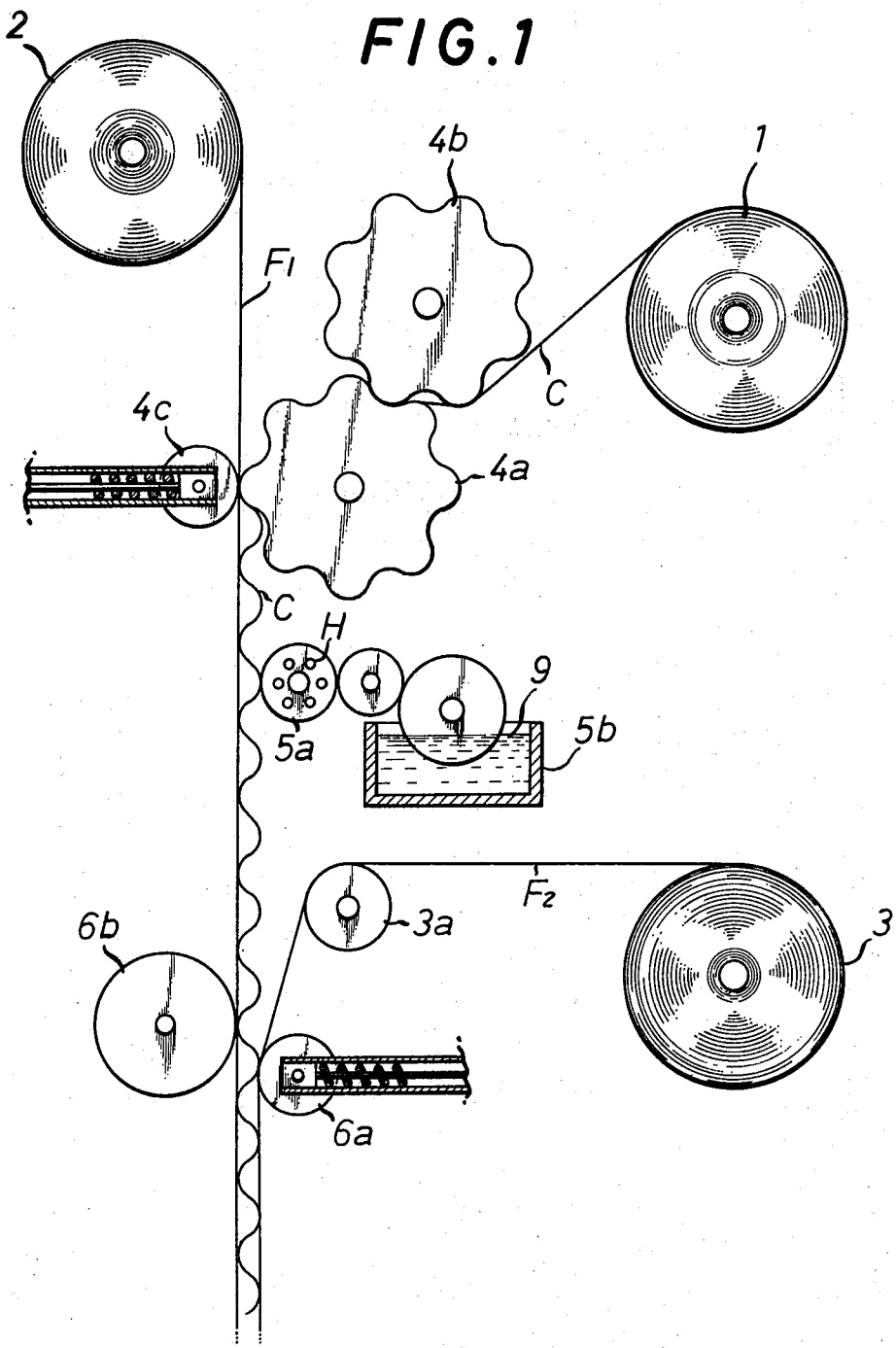

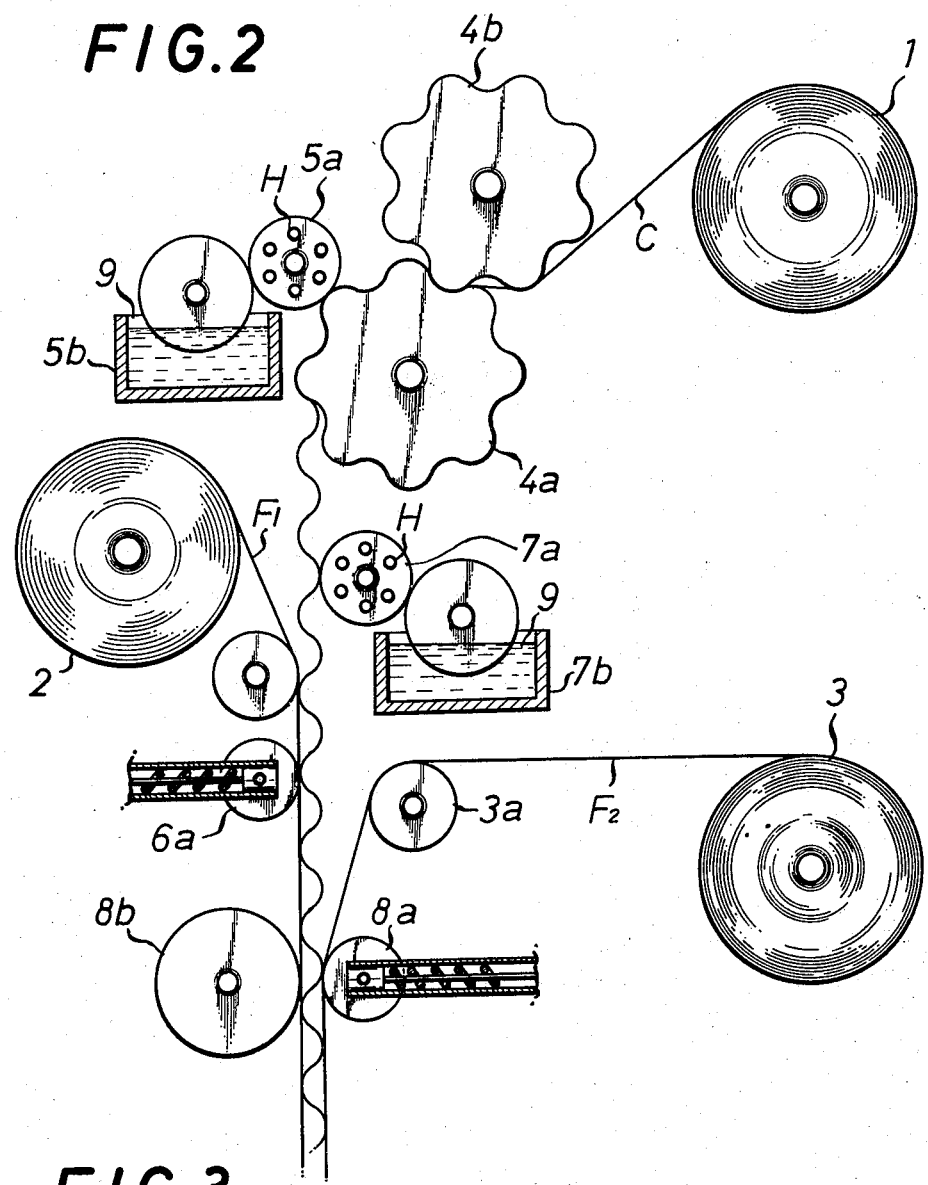
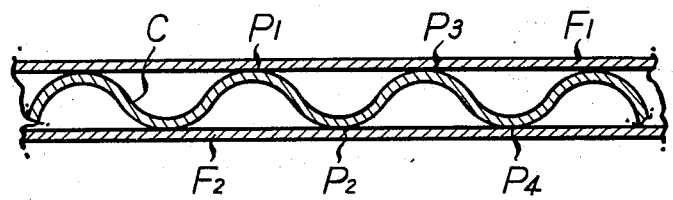

3,698,977
METHOD AND APPARATUS FOR MANUFACTURE OF CORRUGATED SYNTHETIC RESIN BOARD
Rinnosuke Susuki, Tokyo, and Hiroshi Hoshi, Narashinoshi, Japan, assignors to Raion Yushi Kabushiki Kaisha, Tokyo, Japan
Filed Dec. 16, 1969, Ser. No. 885,461
Claims priority, application Japan, Dec. 17, 1968, 43/92,770
Int. Cl. B31f 1/22
U.S. Cl. 156—210
2 Claims

ABSTRACT OF THE DISCLOSURE

The invention relates to a method and apparatus for manufacture of corrugated synthetic resin board from the sheets of a material consisting of polyolefin synthetic resin and a large quantity, 50 to 90%, preferably 70 to 90% of an inorganic filler such as gypsum (calcium sulfate) or calcium sulfite. The material developed by the same inventors has the properties both of paper and synthetic resin and is excellent especially in mechanical strength and resistance to water. The sheet made of said material can be fabricated into corrugated board without deteriorating any property, opposed to the conventional method and apparatus. One flat sheet is adhered to the corrugated sheet by welding or by use of hot melt type adhesives while another flat sheet is adhered to the other side surface of said corrugated sheet by use of hot melt type adhesives.

BACKGROUND OF THE INVENTION

The present invention relates to a method and apparatus for manufacture of corrugated synthetic resin board.

Paperboard having permanent corrugations or sheet with an adherent flat board on one or both sides thereof are well known as corrugated board. But they have not sufficient mechanical strength and resistance to water because the material is paper. In order to eliminate such defects there have been manufactured corrugated boards from synthetic resins such as polyethylene, polypropylene resins, etc., having an excellent mechanical strength and resistance to water. However, there is a problem that a flat sheet or board is not rigidly bonded or adhered to the corrugated sheet. In the manufacture of the corrugated synthetic resin board, the flat sheet is generally heated so as to soften, pressed against the corrugated sheet and cured, thereby bonding them together. When the flat sheet is bonded on one side of the corrugated sheet, backing means such as a cylinder or the like having teeth adapted to engage with the corrugations of the corrugated sheet may be used so as to receive the pressure applied from a heat and pressure application means through the flat sheet, so that a sufficient pressure may be applied to both of the boards or sheets to such an extent that they may be rigidly and securely bonded together along the vertex or bottom lines of the corrugations of the corrugated sheet. But when it is desired to bond another flat sheet upon the other side of the corrugated sheet, the backing means of the character described above is not used this time because the flat sheet has been already bonded to one side of the corrugated sheet. In this case, the bonding pressure is necessarily limited to such an extent that it will not collapse the corrugations of the corrugated sheet. That is, the bonding pressure is not sufficient, so that the flat sheet bonded to the other side of the corrugated sheet tends to be readily separated therefrom when the force is applied to the corrugated board. When an excess pressure is applied, the corrugations will be collapsed in some cases, so that the function of absorbing the shock of the corrugated board when used as packing material will be lost.

The step of bonding the flat sheet or board to the corrugated sheet by welding, that is by heating and applying the pressure generally takes a long time, so that the sheets or boards are intermittently fed. Such step is disadvantageously slow, so that there has been proposed a method in which the flat sheet or sheets are adhered to the corrugated sheet by use of adhesives. This method was readily conceived from the method of manufacture of the paper corrugated board. However, in case of the synthetic resin sheets, they must be heated so as to improve their workability or to readily form the corrugations and after the formation of corrugations, the sheets must be rapidly cooled or cured so that the corrugations may be permanently preserved. Thus, the process for manufacture of the corrugated synthetic resin board is exceedingly complicated. Moreover, it is impossible to improve the production speed when a liquid type adhesive is used as it takes a long time before it is set.

The above described defects are caused by the fact that since the material is switched from the paper to the synthetic resin sheets in the manufacture of the corrugated boards, only such methods, for example heating and cooling the synthetc resin sheets, which are especially suited for forming the syntheetic resin sheets are employed.

Paperboard having permanent corrugations or sheet with an adherent flat board on one or both sides thereof are well known as corrugated board. But they have not sufficient mechanical strength and resistance to water because the material is paper. In order to eliminate these defects there have been manufactured corrugated boards from synthetic resins such as polyethylene, polypropylene resins, etc. having an excellent mechanical strength and resistance against water. However, there is a problem that the flat sheet is not rigidly adhered to the corrugated sheet. That is referring to FIG. 3 generally one flat sheet F–1 is adhered to the corrugated sheet or board C upon one side thereof by engaging the other side of the corrugated sheet with the cylinder or the like having teeth having the same shape as that of the corrugation, so that the cylinder may receive the pressure applied from the heat and pressure application plate which is pressed against the flat sheet F–1 in order to adhere it to the corrugated sheet C. Therefore, the points P–1 and P–3 (that is, the adhesion lines perpendicular to the paper), the flat sheet F–1 can be rigidly and securely adhered to the corrugated sheet C. However, when it is desired to adhere another flat sheet F–2 upon the other side of the corrugated sheet C, the backing means such as the cylinder of the type described above cannot be applied to the corrugated sheet C because the flat sheet F–1 has already adhered thereto. Consequently, at the points P–2, P–4 and so on, the flat sheet F-2 is not adhered to the corrugated sheet C to such an extent as desired to an extent that the adhesiveness is the same as that at the points P-1, P-3 and so on. Thus, the flat sheet F-2 tends to be released or separated from the corrugated sheet C along the welding lines (indicated by the points P-2, P-4, and so on), so that the corrugations are collapsed to the flat surface, so that the function of absorbing shocks or the like of the corrugated board when used as packing and crating material will be completely lost.

The step of bonding or adhering the flat sheet or sheets to the corrugated sheet by welding generally takes a long time, so that the sheets are intermittently fed. Such process is not advantageous so that there has been proposed a method in which the flat sheet or sheets are adhered to the corrugated sheet by use of adhesives. This method is readily conceived from the method of production of the paper corrugated board. However, in case of the synthetic resin sheets, they must be heated in order to improve the workability so that the corrugations may be readily formed. Furthermore, after the formation of corrugations, the sheets must be rapidly cooled in order to maintain their corrugated shapes. Thus, the process for manufacture of the corrugated synthetic resin board is exceedingly complicated. Moreover, it is impossible to improve the production speed when a solvent type adhesive is used as it takes a long time before it is set.

The above described defects are caused by the fact that in manufacture of the corrugated board, the material is switched from the paper to the conventional synthetic resins so that only the method which is suited especially for forming the synthetic resins, for example the method of heating so as to soften the synthetic resins and rapidly cool them for setting or curing is employed. The polyethylene plastics, for example, are not paper at all.

SUMMARY OF THE INVENTION

Accordingly, one of the objects of the present invention is to provide a method and apparatus for manufacture of corrugated synthetic resin boards, which ensures the satisfactory adhesion or bonding of both of the flat sheets to the corrugated core sheet.

Another object of the present invention is to provide a method and apparatus for manufacture of corrugated synthetic resin boards, which can manufacture the corrugated synthetic resin boards at high speed and at room temperature without heating and cooling.

A further object of the present invention is to provide a method and apparatus best suited for the manufacture of corrugated synthetic resin board from the novel material which was invented by the same inventors and consists of polyolefin plastics and a large quantity, 50 to 90%, more preferably 70 to 90% of an inorganic filler such as gypsum and/or calcium sulfite.

In brief, the present invention provides a method and apparatus for manufacture of corrugated synthetic resin boards in which two or three sheets made of the material of the character described above are continuously supplied from the supply reels; the sheet supplied from one of said sheet supply reels are corrugated; the sheet supplied from the second supply reel is adhered to said corrugated sheet by welding or by use of a hot melt type adhesive; and if desired the sheet from the third supply reel is further adhered to the other side of said corrugated sheet by use of the hot melt type adhesive, whereby the corrugated board with an adherent flat sheet upon one or both sides can be manufactured.

The above and other objects, features and advantages of the present invention will become more apparent from the following description of two illustrative embodiments thereof with reference to the accompanying drawings.

BRIEF DESCRIPTION OF THE DRAWING

FIG. 1 is a schematic side view illustrating one embodiment of the present invention;

FIG. 2 is a schematic side view illustrating a second embodiment thereof; and

FIG. 3 is a fragmentary sectional view of corrugated synthetic resin board.

DESCRIPTION OF THE PREFERRED EMBODIMENTS

Prior art

Prior to the description of the preferred embodiments of the present invention, the defects encountered in the conventional method and apparatus will be described in more detail with particular reference to FIG. 3 for the better understanding of the present invention. When the flat sheet F-1 is adhered to the corrugated sheet C, the cylinder or the like having the teeth each having a shape complementary to that of each corrugation of the corrugated sheet is made in engagement with the corrugated sheet so as to receive the pressure applied from the heat and pressure application plate which is directly pressed against the flat sheet F-1 so that it may be bonded to the corrugated sheet. Therefore, the flat sheet F-1 may be firmly and securely bonded or welded to the corrugated sheet along the welding lines indicated by P-1 and P-3. However, when another flat sheet F-2 is desired to be bonded to the corrugated sheet C upon the other side thereof, the backing means such as the cylinder of the type described above cannot be used this time because the flat sheet F-1 has been already adhered to one side of the corrugated sheet C. Therefore, a relatively small force which is not in excess of the force causing the collapse of the corrugations of the corrugated sheet C must be applied when the flat sheet F-2 is adhered to the corrugated sheet C, so that the former is not satisfactorily bonded to the latter along the welding lines P-2, P-4 and so on to an extent as desired or to an extent as in the case of the flat sheet F-1. The flat sheet F-2 therefore tends to separate or release from the corrugated sheet C along the welding lines P-2, P-4 and so on, so that the corrugations are readily collapsed when the force is applied to the corrugated board. Consequently, the function of absorbing the shock of the corrugated board when used as packing and crating material will be lost.

DETAILED DESCRIPTION OF THE PREFERRED EMBODIMENTS

In the method and apparatus for manufacturing corrugated synthetic resin board, a novel material which has been developed by the same inventors and disclosed in the prior filed copending application of the same applicant, Ser. No. 97,770/68, filed in the Japanese Patent Office on Dec. 17, 1968 entitled Corrugated Synthetic Resin Board is used. In brief, the above described novel material consists of polyolefin plastics, an inorganic filler such as gypsum (calcium sulfate), calcium sulfite, etc. in a relatively large quantity, for example 50 to 90 percent and more preferably 70 to 90 percent and 1 to 3% of a viscosity increasing agent such as ABS (acrylonitrile butadiene styrene rubber), EPR (ethylene propylene rubber) etc., and has both of the properties of paper and synthetic resin. The above material has the same plasticity as that of the paper so that the former may be corrugated at room temperature. Furthermore, the above material may be adhered to one another by use of paste or the like as in the case of sheets of paper. As to the strength of the above material, it is substantially same as that of synthetic resin and also has complete resistance to water. It is noted that the most desirable advantages of the present invention may be obtained only when the above material is used.

Referring to FIG. 1, the synthetic resin sheets (to be referred to as "sheets" hereinafter for brevity) are supplied from three sheet supply reels 1, 2 and 3. The sheet C supplied from the reel 1 is corrugated into a predetermined shape by means of a pair of rolls 4a and 4b and thereafter advanced downwardly in the figure. The sheet F-1 supplied from the reel 2 passes in the vicinity of the rolls 4a and is pressed against the corrugated sheet C by means of a heating roller 4c so as to be welded to the corrugated sheet C. In this case, the roll 4a serves as a pressure plate so that the sheet F-1 may be rigidly adhered to the corrugated sheet C.

An adhesive in an adhesive chamber 5b is applied to an adhesive applicaton roller 5a through a suitable roller. The adhesive is preferably of hot melt type because of the reason to be described in more detail hereinafter. Thus, the corrugated sheet C is applied with the adhesive by the adhesive application roller 5a incorporating therein heating means H. The sheet F-2 supplied from the supply reel 3 is changed in the direction by a guide roller 3a so as to advance substantially in parallel with the corrugated sheet C and thereafter is pressed against the corrugated sheet C by means of pressure application means such as rollers 6a and 6b so that the sheet F-2 is rigidly adhered to the corrugated sheet C.

The synthetic resin material used in the present invention has the properties of paper as described hereinabove, the portions adhered one upon another by the conventional adhesive application or glueing and pressure application have sufficient strength and the adhering process may be much facilitated. In the conventional synthetic resin corrugated board, both of the flat board to be applied to the both sides of the corrugated board must be heated and melted so as to adhere them together, so that the adhesiveness of one of the boards adhered to the corrugated board is reduced because of the reasons described above. But according to the present invention such defect can be completely eliminated.

It is noted that instead of heating and welding the sheet F-1 to the corrugated sheet C at 4c and 4a, the adhesive may be used. In this case, the adhesive application and pressure application means such as 6a and 6b may be employed instead of the heating roller 4c.

A second embodiment will be described hereinafter with reference to FIG. 2, in which same reference numerals are used to designate same parts as in FIG. 1. As in the case of the first embodiment, the sheet C continuously supplied from the supply reel 1 is corrugated by the pair of corrugating rolls 4a and 4b. It must be noted that the corrugation may be readily formed at room temperature without preheating, rapid cooling the sheet, etc. because of the plasticity of the material of the sheet as described above.

The hot melt type adhesive 9 which is maintained in melted condition in the chamber 5b is applied by the adhesive application roller 5a to the vertex portions of the corrugated sheet C. In the method and apparatus in accordance with the present invention, it is preferable to use a hot melt type adhesive having a high "adhering velocity" because the flat sheet or board may be rapidly and effectively adhered at room temperature to the corrugated sheet discharged from the corrugation forming rolls 4a and 4b at room temperature. The sheet F-1 supplied from the reel 2 is changed in direction by a guide roller so as to advance in parallel with the corrugated sheet C, and thereafter is pressed against it by the pressure application roller 6a so that the sheet F-1 can be securely adhered to the corrugated sheet C. In case of the corrugated board having only one flat sheet adhered on one side surface thereof, the corrugated board is finished in the above described steps.

When it is desired to manufacture the corrugated board having two flat sheets or boards adhered on both surfaces thereof, the similar adhesive and pressure application means (adhesive roller 7a and an adhesive chamber 7b; and a pair of pressure rollers 8a and 8b) may be provided so that the sheet F-2 supplied from the supply reel 3 may be adhered to the other side surface of the corrugated sheet C in the same manner as described above.

The synthetic resin board manufactured by the method and apparatus described hereinabove has various excellent features, for example the properties of paper and synthetic resin, and can be manufactured in a simple manner and at high speed as compared with the conventional method and apparatus.

The present invention has been described so far with particular reference to the illustrative embodiments thereof, but it will be understood that variations and modifications can be effected without departing from the true spirit of the present invention as described hereinabove and as defined in the appended claims.

What is claimed is:

1. A method of manufacturing a synthetic resin corrugated sheet made of a material consisting essentially of polyolefin synthetic resin, inorganic filler selected from the group of calcium sulfate and calcium sulfite, and a viscosity increasing agent selected from the group of acrylonitrile butadiene styrene rubber and ethylene propylene rubber, comprising the steps of corrugating a first flat sheet at room temperature; heating and welding a second flat sheet upon one side surface of said corrugated sheet; applying a hot melt type adhesive to vertex portions of the other side surface of said corrugated sheet; positioning a third flat sheet with said vertex portions of said corrugated sheet and pressing said third flat sheet against said corrugated sheet, thereby adhering this sheet to said corrugated sheet, wherein:

(1) said second flat sheet is heated and simultaneously pressed elastically against one by one vertex portion of one side surface of said corrugated sheet while the latter sheet being supported from the other side surface thereof to make a rigid and secure welding;

(2) said hot melt type adhesive is applied under heating to one by one vertex portion of the other side surface of said corrugated sheet to facilitate a rapid application; and (3) said third flat sheet is pressed elastically against one by one vertex portion of the other side surface of said corrugated sheet while one side surface of the latter sheet welding said second flat sheet thereto being pressed along one by one welded line opposed and adjacent to an adhered line of said third flat sheet to complete the facing of said corrugated sheet.

2. A method of manufacturing a synthetic resin corrugated sheet made of a material consisting essentially of polyolefin synthetic resin, inorganic filler selected from the group of calcium sulfate and calcium sulfite, and a viscosity increasing agent selected from the group of acrylonitrile butadiene styrene rubber and ethylene propylene rubber, comprising the steps of corrugating a first sheet at room temperature; applying a hot melt type adhesive to vertex portions of both side surfaces of said corrugated sheet; positioning second and third flat sheets in parallel and on opposite sides of said corrugated sheet with each sheet contacting the vertex portions on one side of said corrugated sheet, and pressing said second and third flat sheets against said corrugated sheet, thereby adhering said second and third flat sheets to said corrugated sheet, characterized in that:

(1) said hot melt type adhesive is applied under heating to one by one vertex portion of both side surfaces of said corrugated sheet to facilitate a rapid application;

(2) said second flat sheet is pressed elastically against one by one vertex portion of one side surface of said corrugated sheet to be adhered rigidly and uniformly to the latter sheet; and (3) said third flat sheet is pressed elastically against one by one vertex portion of the other side surface of said corrugated sheet while one side surface of the latter sheet adhering said second flat sheet thereto being pressed along one by one adhered line opposed and adjacent to an adhered line of said third flat sheet to complete the facing of said corrugated sheet.

(References on following page)

References Cited

UNITED STATES PATENTS

| | | | |
|---|---|---|---|
| 3,317,363 | 5/1967 | Weber | 156—210 |
| 3,518,142 | 6/1970 | Dooley | 156—210 X |
| 3,468,734 | 9/1969 | Shields | 156—210 |
| 3,127,292 | 3/1964 | Early | 156—210 X |
| 3,189,502 | 6/1965 | Little | 156—210 |
| 3,411,689 | 11/1968 | Brackett | 156—210 X |
| 2,299,988 | 10/1942 | Irving | 156—210 X |

FOREIGN PATENTS

| | | | |
|---|---|---|---|
| 790,228 | 2/1958 | Great Britain | 156—219 |

BENJAMIN A. BORCHELT, Primary Examiner

G. E. MONTONE, Assistant Examiner

U.S. Cl. X.R.

156—470